US011457180B2

United States Patent
Asari

(10) Patent No.: US 11,457,180 B2
(45) Date of Patent: Sep. 27, 2022

(54) VIDEO MONITORING SUPPORT APPARATUS, VIDEO MONITORING SUPPORT METHOD, AND COMPUTER READABLE RECORDING MEDIUM

(71) Applicant: NEC Corporation, Tokyo (JP)

(72) Inventor: Toshiyuki Asari, Tokyo (JP)

(73) Assignee: NEC CORPORATION, Tokyo (JP)

( * ) Notice: Subject to any disclaimer, the term of this patent is extended or adjusted under 35 U.S.C. 154(b) by 67 days.

(21) Appl. No.: 16/981,833

(22) PCT Filed: Mar. 25, 2019

(86) PCT No.: PCT/JP2019/012527
§ 371 (c)(1),
(2) Date: Sep. 17, 2020

(87) PCT Pub. No.: WO2019/188994
PCT Pub. Date: Oct. 3, 2019

(65) Prior Publication Data
US 2021/0258542 A1    Aug. 19, 2021

(30) Foreign Application Priority Data
Mar. 28, 2018   (JP) .............................. JP2018-062890

(51) Int. Cl.
*H04N 7/00*    (2011.01)
*H04N 7/18*    (2006.01)
(Continued)

(52) U.S. Cl.
CPC ............. *H04N 7/181* (2013.01); *G06V 20/64* (2022.01); *H04N 5/22525* (2018.08)

(58) Field of Classification Search
CPC ............ H04N 7/00; H04N 5/00; G06V 10/00; G06V 20/00
See application file for complete search history.

(56) References Cited

U.S. PATENT DOCUMENTS

2014/0267751 A1    9/2014   Kitagawa

FOREIGN PATENT DOCUMENTS

JP    2008-118376 A    5/2008
JP    2009-017179 A    1/2009
(Continued)

OTHER PUBLICATIONS

English translation of Written opinion for PCT Application No. PCT/JP2019/012527, dated Jun. 11, 2019.
(Continued)

*Primary Examiner* — Maryam A Nasri
(74) *Attorney, Agent, or Firm* — Sughrue Mion, PLLC

(57) ABSTRACT

A video monitoring support apparatus 10 provides support to make settings in a new monitoring camera in a video monitoring system in which discriminators are used to detect objects. The video monitoring support apparatus 10 includes a region acquisition unit 11 that acquires, from the video monitoring system, information regarding a discriminator application region that is set to an existing monitoring camera in order to detect an object with a discriminator, and a region setting unit 12 that uses the acquired information to set, to the video monitoring system, a discriminator application region of the new monitoring camera.

9 Claims, 12 Drawing Sheets

(51) Int. Cl.
    *H04N 5/225*     (2006.01)
    *G06V 20/64*     (2022.01)

(56) References Cited

FOREIGN PATENT DOCUMENTS

| JP | 2009017179 A | * | 1/2009 | ............... G06T 1/00 |
| JP | 2012-123626 A | | 6/2012 | |
| JP | 2014-179923 A | | 9/2014 | |
| JP | 2016-206995 A | | 12/2016 | |

OTHER PUBLICATIONS

International Search Report for PCT Application No. PCT/JP2019/012527, dated Jun. 11, 2019.

* cited by examiner

Fig.4

| CAMERA ID | DISCRIMINATOR | STATE | CANDIDATE REGION FORMULA (ORIGIN AT BOTTOM LEFT) | DOMAIN |
|---|---|---|---|---|
| 0001 | CAR | FACING RIGHT; ENTIRETY | h = 600 | 0 <= w <= 1600 |
| | | FACING RIGHT; RIGHT HALF | h = 300 | 150 <= w <= 230 |
| | | FACING FRONT; ENTIRETY | h = 16w − 9600 | 600 <= w <= 700 |
| | | ⋮ | | |
| | PEDESTRIAN | FACING RIGHT; ENTIRETY | h = 320 | 0 <= w <= 1600 |
| | ⋮ | | | |

VIDEO MONITORING SUPPORT APPARATUS, VIDEO MONITORING SUPPORT METHOD, AND COMPUTER READABLE RECORDING MEDIUM

CROSS REFERENCE TO RELATED APPLICATIONS

This application is a National Stage of Application No. PCT/JP2019/012527 filed Mar. 25, 2019 the disclosure of which is incorporated herein in its entirety by reference.

TECHNICAL FIELD

The invention relates to a video monitoring support apparatus and a video monitoring support method for supporting the installation of monitoring cameras forming a video monitoring system, and further relates to a computer readable recording medium that includes, recorded thereon, a program for realizing the video monitoring support apparatus and the video monitoring support method.

BACKGROUND ART

In recent years, in a video monitoring system, objects such as people and vehicles are automatically detected from a video captured using a monitoring camera (refer to Patent Documents 1 and 2, for example). It can be considered that, according to such a video monitoring system, an administrator's burden of monitoring can be alleviated, and higher crime-prevention and disaster-prevention capabilities can be achieved.

Also, the automatic detection of objects is performed, for example, by constructing a discriminator in advance for each object to be detected, and applying the discriminator to image data from the monitoring camera. Specifically, the discriminator is constructed by focusing on the color and shape of the object to be detected, and by setting feature values for distinguishing the object.

Also, the application of the discriminator to the image data is performed for each specific subregion extracted from the image data. The extraction of the specific subregions is performed, for example, while shifting the position of the region to be extracted a fixed number of pixels at a time according to a sliding window method.

If such a sliding window method is adopted, the object to be detected can be detected accurately. However, subregions need to be extracted from the entire image plane, resulting in a large processing load and an increase in the time spent for processing in the monitoring system.

For this reason, in the video monitoring systems disclosed in Patent Documents 1 and 2, an image region in which an object is likely to be detected is set in advance as a discriminator application region, and the discriminator is applied only to the discriminator application region that is set. Also, in the video monitoring systems disclosed in Patent Documents 1 and 2, the administrator manually sets a discriminator application region for each object to be detected. Specifically, an area near the entrance of a building to be monitored, an area around an intersection, a shoulder of a road, and the like are examples of regions that are set as discriminator application regions.

LIST OF RELATED ART DOCUMENTS

Patent Document

Patent Document 1: Japanese Patent Laid-Open Publication No. 2008-118376
Patent Document 2: Japanese Patent Laid-Open Publication No. 2009-017179

SUMMARY OF INVENTION

Problems to be Solved by the Invention

Incidentally, according to the video monitoring systems disclosed in the above-mentioned Patent Documents 1 and 2, the administrator needs to newly set discriminator application regions each time a monitoring camera is newly installed, and the installation of a new monitoring camera requires time and human cost.

An example object of the invention is to provide a video monitoring support apparatus, a video monitoring support method, and a computer readable recording medium that are capable of suppressing the incurrence of time and human cost in a case in which a new monitoring camera is installed.

Means for Solving the Problems

In order to achieve the above-described object, a video monitoring support apparatus according to an example aspect of the invention is an apparatus for providing support to make settings in a new monitoring camera in a video monitoring system in which a discriminator is used to detect an object, the video monitoring support apparatus including:

a region acquisition unit configured to acquire, from the video monitoring system, information regarding a discriminator application region that is set to an existing monitoring camera in order to detect an object with a discriminator; and a region setting unit configured to set, to the video monitoring system, a discriminator application region of the new monitoring camera, using the acquired information.

Also, in order to achieve the above-described object, a video monitoring support method according to an example aspect of the invention is a method for providing support to make settings in a new monitoring camera in a video monitoring system in which a discriminator is used to detect an object, the video monitoring support method including:

(a) a step of acquiring, from the video monitoring system, information regarding a discriminator application region that is set to an existing monitoring camera in order to detect an object with a discriminator; and (b) a step of setting, to the video monitoring system, a discriminator application region of the new monitoring camera, using the acquired information.

Furthermore, in order to achieve the above-described object, a computer readable recording medium according to an example aspect of the invention is a computer readable recording medium that includes, recorded thereon, a program for providing support, by means of a computer, to make settings in a new monitoring camera in a video monitoring system in which a discriminator is used to detect an object, the program including instructions that cause the computer to carry out:

(a) a step of acquiring, from the video monitoring system, information regarding a discriminator application region that is set to an existing monitoring camera in order to detect an object with a discriminator; and (b) a step of setting, to the video monitoring system, a discriminator application region of the new monitoring camera, using the acquired information.

BRIEF DESCRIPTION OF THE DRAWINGS

FIG. 4 is a diagram illustrating one example of discriminator application region information used in the example embodiment of the invention.

EXAMPLE EMBODIMENT

Overview of Invention

In a video monitoring system, for each discriminator, a region in which the corresponding object appears is set as a discriminator application region, and this discriminator application region is a fixed region on a video from a monitoring camera. For example, the discriminator application region is an area near an entrance of a building, an area around an intersection, a shoulder of a road, or the like. Furthermore, it is unlikely for this discriminator application region to change significantly even in a case in which a new monitoring camera is installed at a different monitoring point or the like. Consequently, it can be considered that the setting of discriminator application regions for individual discriminators need not be performed for the new monitoring camera spending time and human cost, and instead, discriminator application regions that are already set can be applied.

Accordingly, in the invention, a reduction in time and human cost is achieved by making existing discriminator application regions available for use in a case in which a monitoring camera is newly installed in a video monitoring system. Also, in the invention, existing discriminator application regions are presented on a screen for an administrator, etc., to see, so that the administrator can perform checking, correcting, etc., on the existing discriminator application regions.

Example Embodiment

In the following, a video monitoring support apparatus, a video monitoring support method, and a program in an example embodiment of the invention will be described with reference to FIGS. 1 to 12.

[Apparatus Configuration]

Figure 1:
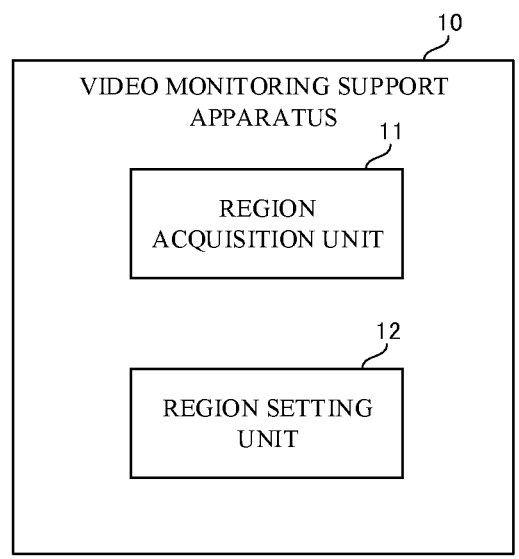
FIG. 1 is a block diagram illustrating an overall configuration of a video monitoring support apparatus in an example embodiment of the invention.

First, an overall configuration of the video monitoring support apparatus in the example embodiment of the invention will be described with reference to FIG. 1. FIG. 1 is a block diagram illustrating the overall configuration of the video monitoring support apparatus in the example embodiment of the invention.

A video monitoring support apparatus 10 in the present example embodiment, which is illustrated in FIG. 1, is a device for providing support to make settings in a new monitoring camera in a video monitoring system in which discriminators are used to detect objects.

As illustrated in FIG. 1, the video monitoring support apparatus 10 includes a region acquisition unit 11 and a region setting unit 12. The region acquisition unit 11 acquires, from the video monitoring system, information regarding a discriminator application region that is set to an existing monitoring camera in order to detect an object with a discriminator. The region setting unit 12 uses the acquired information to set, to the video monitoring system, a discriminator application region for a new monitoring camera.

In the present example embodiment, in a case in which a monitoring camera is newly installed, a discriminator application region that was set to an existing monitoring camera can be applied to the new monitoring camera, as described above. Accordingly, the incurrence of time and human cost can be suppressed according to the present example embodiment.

Figure 2:
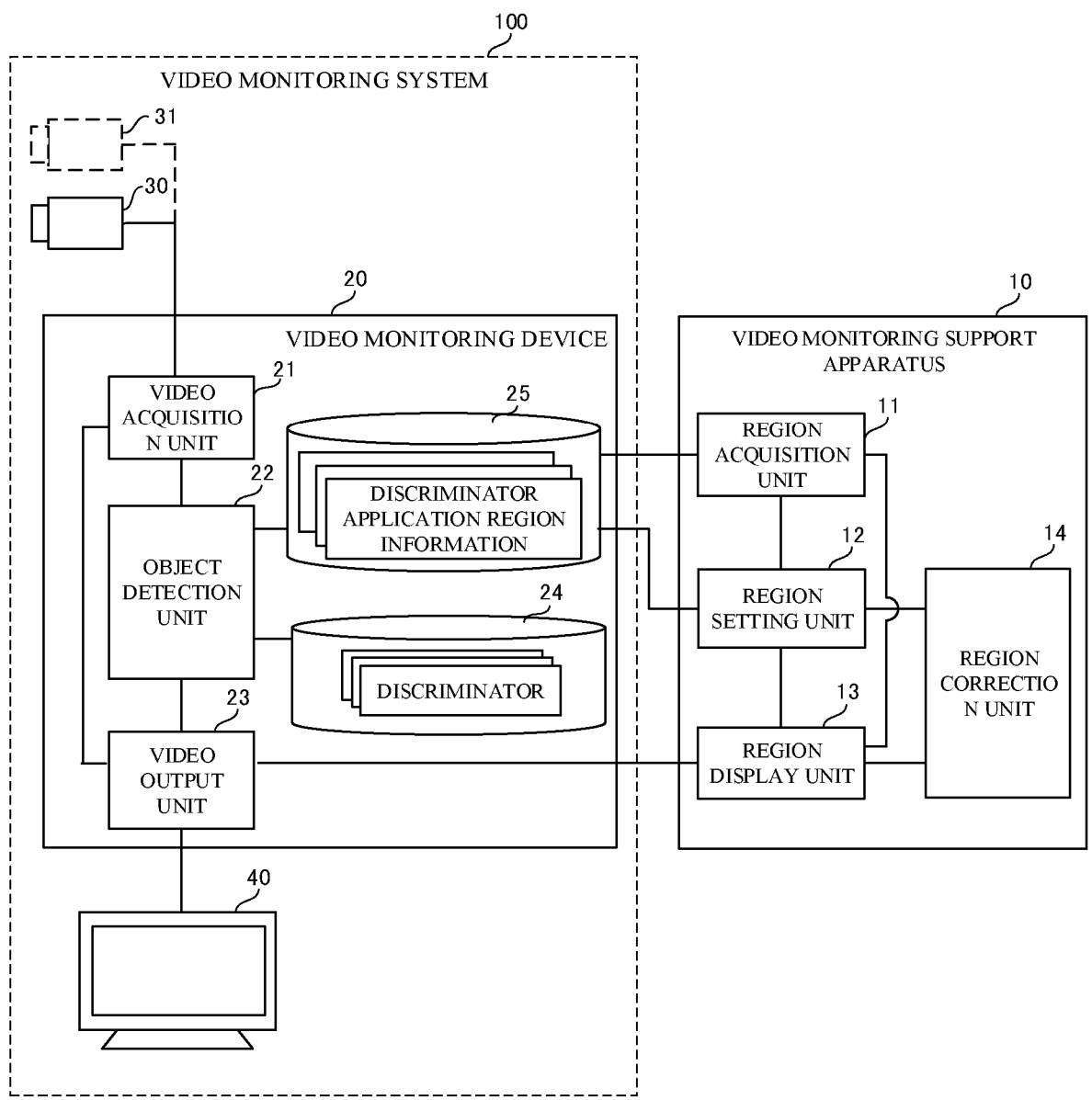
FIG. 2 is a block diagram illustrating a specific configuration of the video monitoring support apparatus in the example embodiment of the invention.
Figure 3:
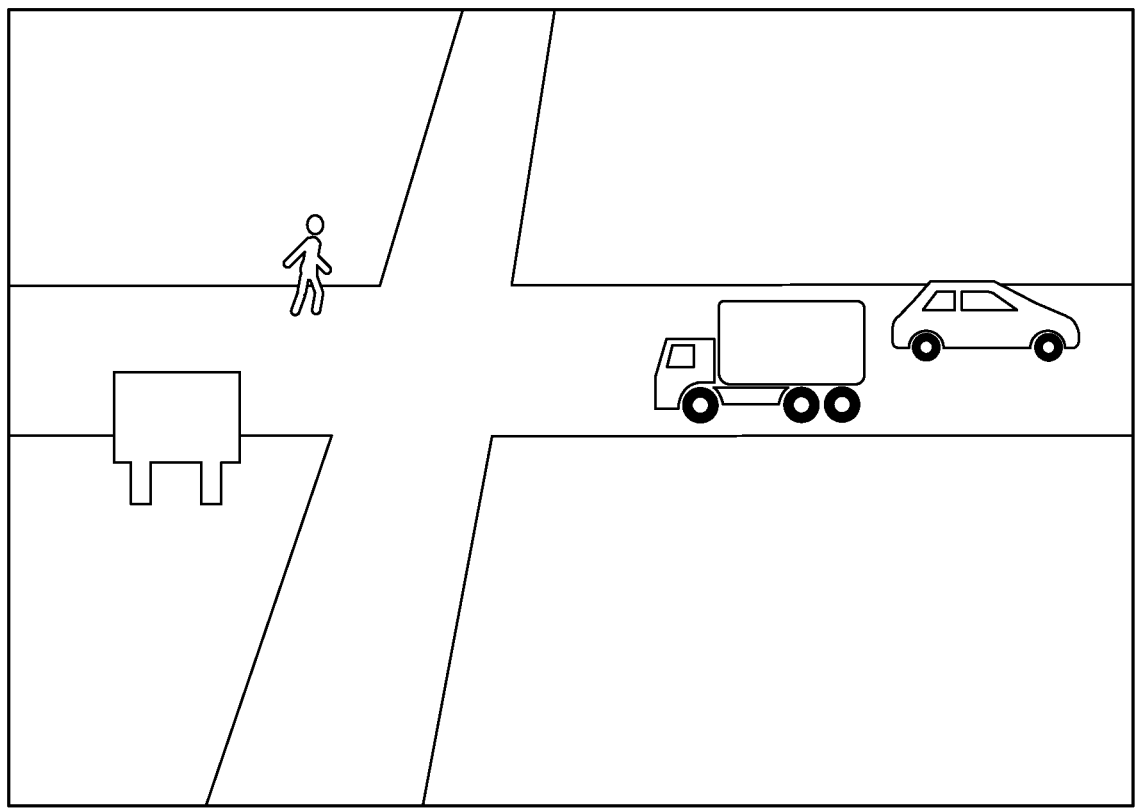
FIG. 3 is a diagram illustrating one example of a video output from a video monitoring system.

Next, the configuration of the video monitoring support apparatus in the present example embodiment will be described specifically with reference to FIGS. 2 to 4. FIG. 2 is a block diagram illustrating a specific configuration of the video monitoring support apparatus in the example embodiment of the invention. FIG. 3 is a diagram illustrating one example of a video output from a video monitoring system. FIG. 4 is a diagram illustrating one example of discriminator application region information used in the example embodiment of the invention.

As illustrated in FIG. 2, the video monitoring support apparatus 10 supports a video monitoring system 100 in the present example embodiment. The video monitoring system 100 includes a video monitoring device 20, a monitoring camera 30, and a display device 40. Also, reference numeral "31" in FIG. 2 indicates a new monitoring camera.

The video monitoring device 20 includes a video acquisition unit 21, an object detection unit 22, and a video output unit 23. Also, the video monitoring device 20 holds discriminators 24 constructed for individual objects to be detected, and discriminator application region information 25 specifying discriminator application regions set for the individual discriminators 24.

The video acquisition unit 21 acquires video data output by the monitoring camera 30 in units of frames, and inputs the video data to the object detection unit 22 and the video output unit 23. Accordingly, as illustrated in FIG. 3, the video output unit 23 displays, on a screen of the display device 40, a video that is based on the input video data. In the example illustrated in FIG. 3, the monitoring camera 30 is a fixed-point camera, and the angle-of-view size (w)×(h) is set to around 1600×900.

If video data is input thereto, the object detection unit 22, for each frame, uses the discriminators 24 and detects the objects corresponding to the discriminators 24, which are for example a passenger car, a truck, a pedestrian, and the like illustrated in FIG. 3. Specifically, the object detection unit 22 first uses the discriminator application region information 25 and specifies the discriminator application region to be applied for each discriminator 24. Next, the object detection unit 22 applies the corresponding discriminator 24 to each discriminator application region specified in the target frame, and if a region having the feature values set by the discriminator 24 is extracted, detects the region as an object.

As illustrated in FIG. 4, the discriminator application region information 25 includes a plurality of records, and each record indicates a discriminator application region corresponding to one discriminator 24. In addition, the discriminator application region information 25 is created as a flat file that is a CSV file or the like, for example.

Also, in the example illustrated in FIG. 4, a camera ID indicates the ID of the corresponding monitoring camera, "discriminator" indicates an object to be detected, and "state" indicates a state of the object to be detected. "Candidate region formula" indicates a formula expressing a frame region in which the object is present. "Domain" indicates a range in which the candidate region formula is valid. Furthermore, a discriminator application region is defined by a "candidate region formula" and a "domain".

Also, in the example illustrated in FIG. 4, "h" indicates the vertical-direction axis of the frame, and "w" indicates the horizontal-direction axis of the frame. Furthermore, in the example illustrated in FIG. 3, the origins of the h axis and the w axis are set at the lower left corner of the frame.

Accordingly, in FIG. 4, a candidate region formula "h=600" and a domain "$0 \leq w \leq 1600$" are set with regard to a discriminator for a car whose entirety appears facing the right in a monitoring camera having a camera ID "0001", for example. In this case, a 1600-pixel-long line that is positioned 600-pixels upward from the bottom and that extends toward the right in the horizontal direction from the left end is the discriminator application region. Also, while linear formulas are used as candidate region formulas in the example illustrated in FIG. 4, the present example embodiment is not limited to this, and inequalities may be used as candidate region formulas.

Also, in the present example embodiment, the video monitoring support apparatus 10 further includes a region display unit 13 and a region correction unit 14 in addition to the region acquisition unit 11 and the region setting unit 12 described above, as illustrated in FIG. 2.

In the present example embodiment, based on the camera ID of the existing monitoring camera 30, the region acquisition unit 11 acquires, from the discriminator application region information 25 held by the video monitoring device 20, the discriminator application region information set to this monitoring camera 30. Furthermore, the region acquisition unit 11 inputs the acquired discriminator application region information to the region setting unit 12 and the region display unit 13.

The region setting unit 12 uses the discriminator application region information input by the region acquisition unit 11 and creates new records in which the camera ID of the new monitoring camera 31 is set as the camera ID, and adds the created records to the discriminator application region information 25.

Once the new monitoring camera 31 is installed, the region display unit 13 displays the discriminator application regions specified by the discriminator application region information input by the region acquisition unit 11 on a video from the new monitoring camera 31.

Specifically, the region display unit 13 outputs, to the video output unit 23, image data indicating the discriminator application regions to be displayed. Accordingly, the video output unit 23 displays, on the screen of the display device 40, a video in which the discriminator application regions are overlaid on the video from the monitoring camera 31. Also, the discriminator application regions that are overlaid on the video here are the discriminator application regions set to the existing monitoring camera 30.

If an administrator of the video monitoring system 100 provides an instruction to correct a discriminator application region displayed on the screen of the display device 40, the region correction unit 14 accepts the correction to the discriminator application region. Also, if the administrator of the video monitoring system 100 adds a new discriminator application region on the video, the region correction unit 14 can also accept the addition of this new discriminator application region. Furthermore, if the administrator of the video monitoring system 100 provides an instruction to delete a displayed discriminator application region, the region correction unit 14 can also accept the deletion of this discriminator application region.

Also, in the present example embodiment, the correction, addition, and deletion by the administrator are performed via input equipment such as a mouse, a touch panel, a keyboard, and the like, although not illustrated in FIG. 2. The region correction unit 14 receives an input operation performed by means of input equipment, and specifies the instruction provided by the administrator from the input operation received.

Furthermore, as described above, if a correction is accepted by the region correction unit 14, the region display unit 13 reflects the accepted correction on the video. In addition, in this case, the region setting unit 12 sets the corrected discriminator application region as a discriminator application region of the new monitoring camera 31.

Also, as described above, if an addition of a new discriminator application region is accepted by the region correction unit 14, the region display unit 13 displays, on the video, the new discriminator application region that has been accepted. Furthermore, in this case, the region setting unit 12 also sets the new discriminator application region that has been added as a discriminator application region of the new monitoring camera 31.

In addition, as described above, if a deletion of a discriminator application region is accepted by the region correction unit 14, the region display unit 13 deletes, on the video, the discriminator application region the deletion of which has been accepted. Furthermore, in this case, the region setting unit 12 excludes the discriminator application region the deletion of which has been accepted from the discriminator application regions of the new monitoring camera 31.

[Apparatus Operations]

Figure 5:
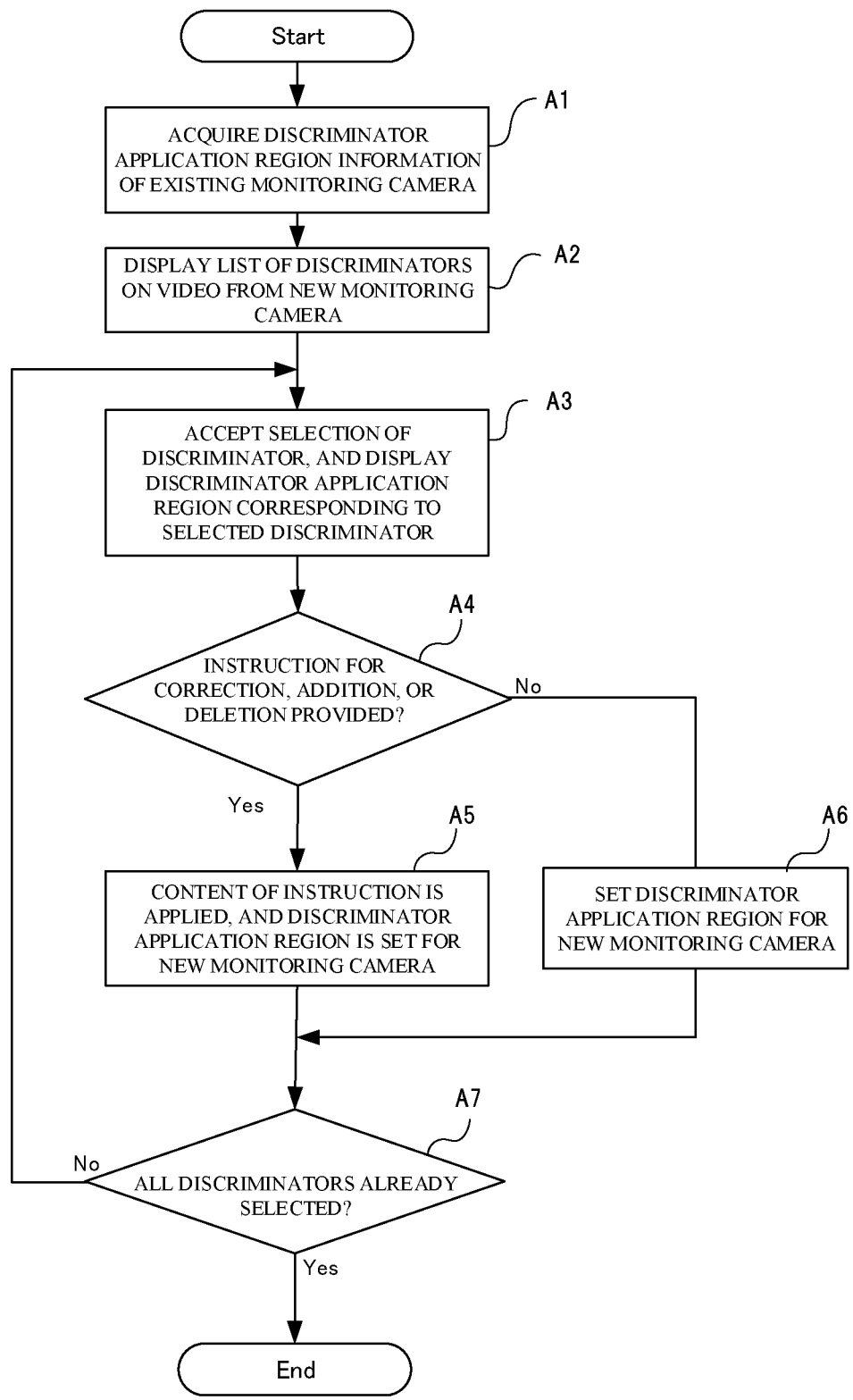
FIG. 5 is a flowchart illustrating operations of the video monitoring support apparatus in the example embodiment of the invention.

Next, operations of the video monitoring support apparatus 10 in the present example embodiment will be described with reference to FIGS. 5 to 11. FIG. 5 is a flowchart illustrating operations of the video monitoring support apparatus in the example embodiment of the invention. FIGS. 1 to 4 will be referred to as needed in the following description. Also, in the present example embodiment, a video monitoring support method is implemented by causing the video monitoring support apparatus 10 to operate. Accordingly, the following description of the operations of the video monitoring support apparatus 10 is substituted for the description of the video monitoring method in the present example embodiment.

First of all, it is assumed that the new monitoring camera 31 has been installed, and that video data from the new monitoring camera 31 is transmitted to the video monitoring device 20, and the video output unit 23 is displaying a video based on the transmitted video data on the screen of the display device 40. Steps A1 to A7 described in the following are executed in this state.

As illustrated in FIG. 5, in the video monitoring support apparatus 10, the region acquisition unit 11 first accesses the discriminator application region information 25 held by the video monitoring device 20. Furthermore, based on the camera ID of the existing monitoring camera 30, the region acquisition unit 11 acquires the discriminator application region information set to this monitoring camera 30 (step A1). Also, in step A1, the region acquisition unit 11 inputs the acquired discriminator application region information to the region setting unit 12 and the region display unit 13.

Next, the region display unit 13 specifies the discriminators used in the existing monitoring camera 30 from the discriminator application region information acquired in step A1, and displays a list of the specified discriminators on the video from the new monitoring camera 31 (step A2).

Figure 6:
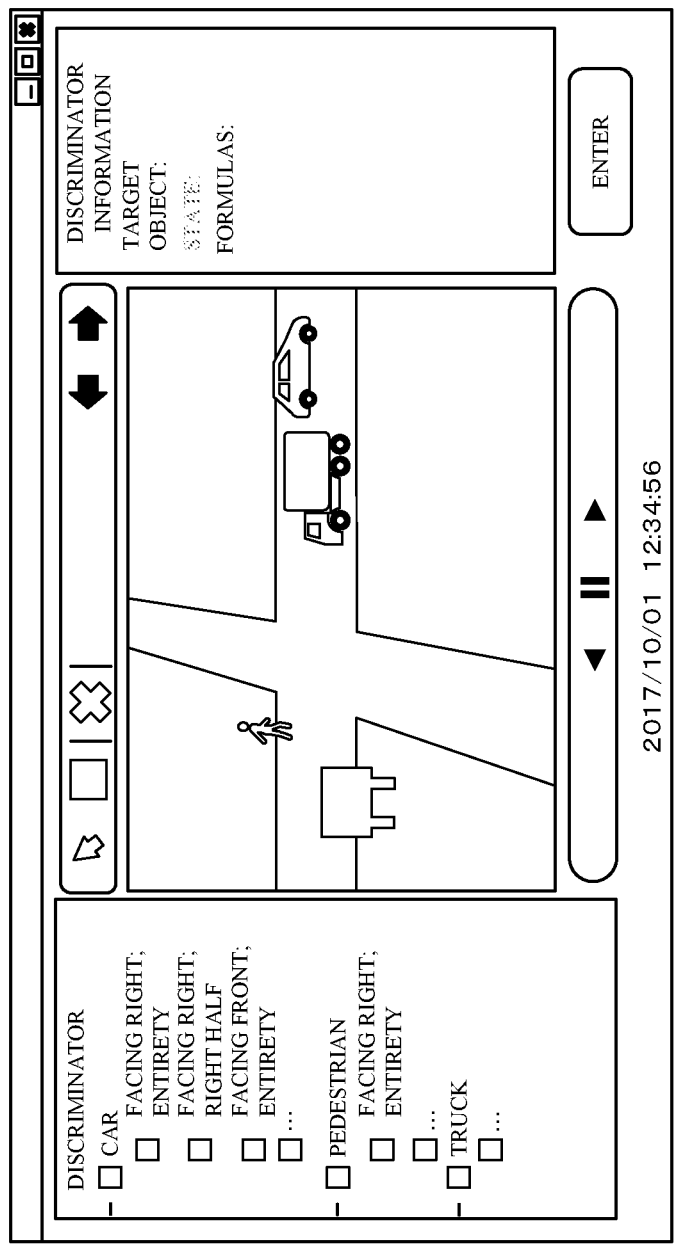
FIG. 6 is a diagram illustrating an example of a list of discriminators displayed on a video from a monitoring camera in the example embodiment of the invention.

Specifically, the region display unit 13 extracts information in the items "object" and "state" from the discriminator application region information, and transmits the extracted information to the video output unit 23. Accordingly, as illustrated in FIG. 6, the video output unit 23 displays a list of discriminators together with the video from the monitoring camera on the screen of the display device 40. FIG. 6 is a diagram illustrating an example of a list of discriminators displayed on the video from the monitoring camera in the example embodiment of the invention.

In the example illustrated in FIG. 6, the list of discriminators is displayed in a left-side part of the screen so that each discriminator can be specified by the name and state of the target object. Also, in the example illustrated in FIG. 6, the video from the monitoring camera is displayed based on a conventional moving picture playback format. In this case, playback, stopping, pausing, and the like of the video can be performed. Also, the display format of the video is not limited to this, and a format other than a moving picture playback format may be adopted.

Next, if the administrator selects any one of the discriminators on the screen, the region display unit 13 accepts the selection. Furthermore, the region display unit 13 displays the discriminator application region corresponding to the selected discriminator (step A3).

Specifically, once a discriminator is selected, the region display unit 13 extracts information regarding the "candidate region formula" and "domain" corresponding to the selected discriminator, and specifies the position and size of the discriminator application region based on the extracted information. Furthermore, the region display unit 13 transmits, to the video output unit 23, image data of the discriminator application region whose position and size have been specified.

Figure 7:
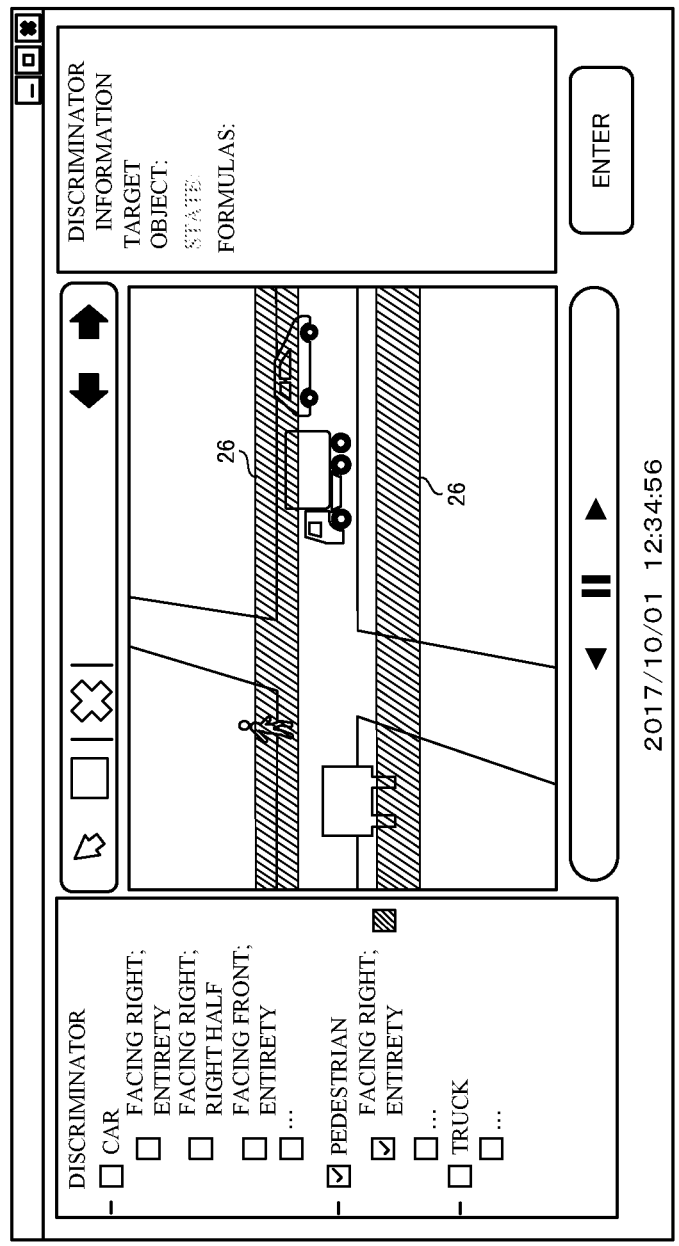
FIG. 7 is a diagram illustrating one example of a discriminator application region displayed on the video from the monitoring camera in the example embodiment of the invention.

Accordingly, on the screen of the display device 40, the video output unit 23 displays a discriminator application region 26 on the video from the monitoring camera, as illustrated in FIG. 7. FIG. 7 is a diagram illustrating one example of a discriminator application region displayed on the video from the monitoring camera in the example embodiment of the invention. In FIG. 7, the discriminator application region is the region indicated by diagonal lines.

Figure 8:
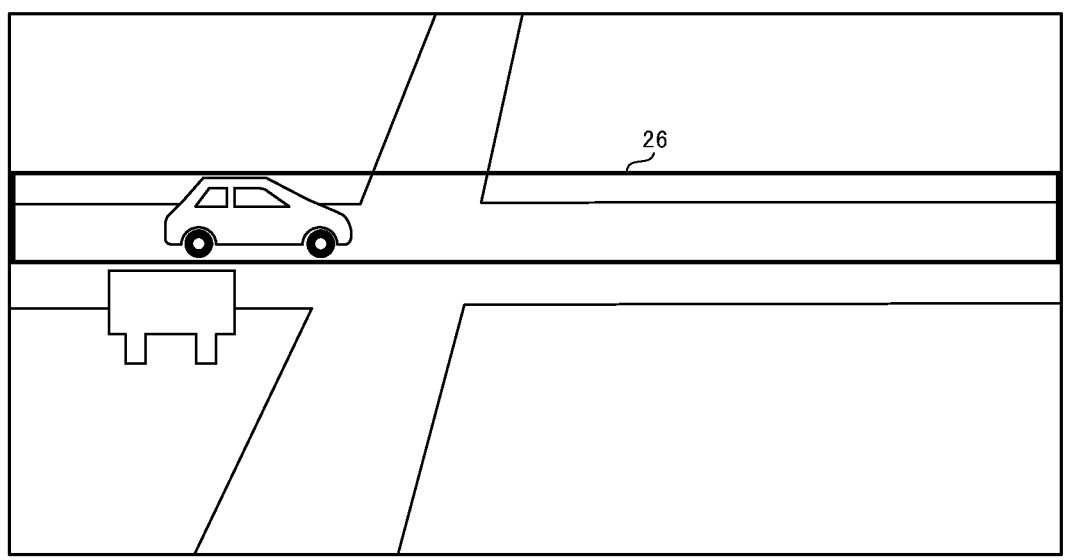
FIG. 8 is a diagram illustrating another example of a discriminator application region displayed on the video from the monitoring camera in the example embodiment of the invention.

In the example illustrated in FIG. 7, the discriminator for "pedestrian/facing right; entirety" is selected. Also, in the example illustrated in FIG. 7, the discriminator application region is displayed in a semi-transparent state in an overlaid format. In addition, this display format is not limited to the example illustrated in FIG. 7, and for example, the discriminator application region 26 may be displayed so as to be surrounded by a frame, as illustrated in FIG. 8. FIG. 8 is a diagram illustrating another example of a discriminator application region displayed on the video from the monitoring camera in the example embodiment of the invention.

Also, if a plurality of camera IDs are registered in the discriminator application region information 25, discriminator application regions applied to existing monitoring cameras other than the existing monitoring camera 30 are also displayed. In the example illustrated in FIG. 7, the lower discriminator application region in the drawing is a discriminator application region applied to an existing monitoring camera other than the monitoring camera 30. Also, display in such a manner is performed because, if there are a plurality of monitoring cameras to which a discriminator is applied, discriminator application regions are represented by a union thereof. Note that a calculation method other than a union may be adopted in the present example embodiment.

Next, if step A3 is executed, the region correction unit 14 determines whether or not an instruction for correction, addition, or deletion is provided in connection with the displayed discriminator application region (step A4).

If the result of the determination in step A4 is that an instruction is provided, the region correction unit 14 accepts the instruction, and notifies the region display unit 13 and the region correction unit 14 that the instruction has been accepted. Accordingly, the region display unit 13 executes processing in accordance with the instruction, and the region setting unit 12 displays the discriminator application region in which the instruction is reflected as a discriminator application region of the new monitoring camera 31 (step A5).

On the other hand, if the result of the determination in step A4 is that an instruction is not provided, the region setting unit 12 uses the discriminator application region information acquired in step A1 to set a discriminator application region of the new monitoring camera 31 (step A6).

Once step A5 or A6 is executed, the region setting unit 12 determines whether all of the discriminators displayed in step A2 have been selected (step A7). If the result of the determination in step A7 is that not all of the discriminators have been selected, step A3 is executed again. On the other hand, if the result of the determination in step A7 is that all of the discriminators have been selected, the processing in the video monitoring support apparatus 10 is completed.

Figure 9:
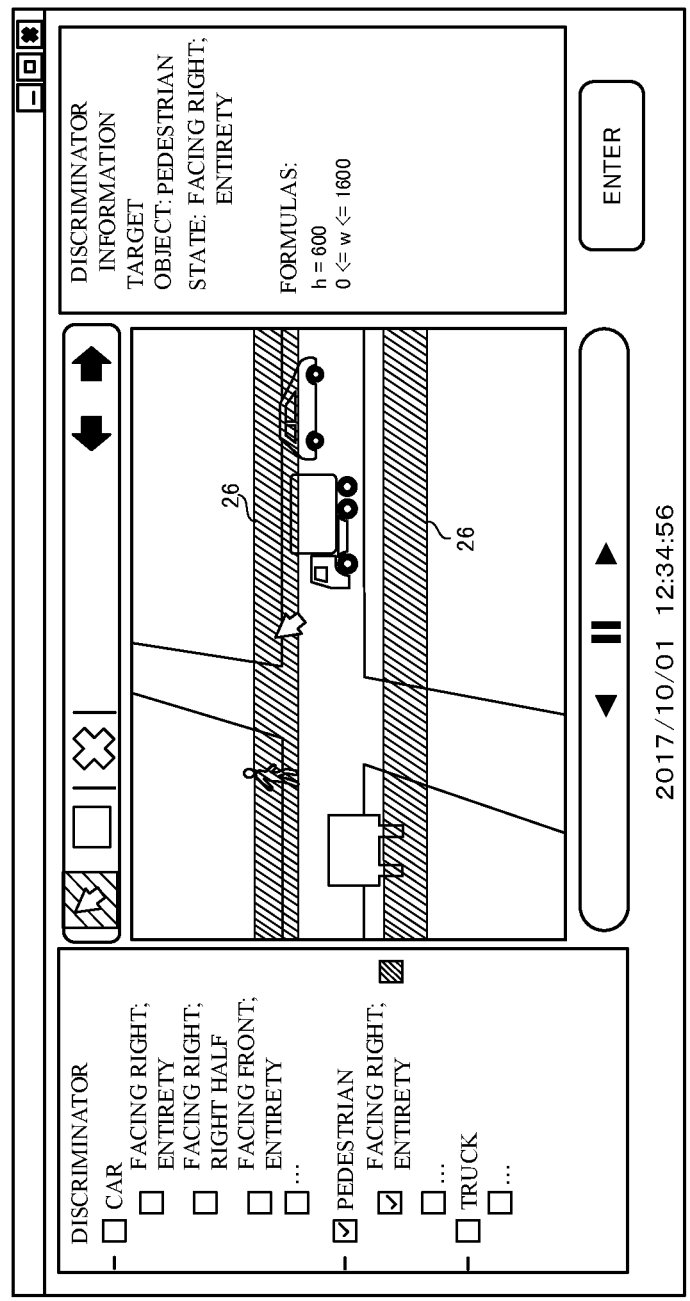
FIG. 9 is a diagram illustrating one example of a screen in a case in which an administrator has corrected a discriminator application region in the example embodiment of the invention.
Figure 10:
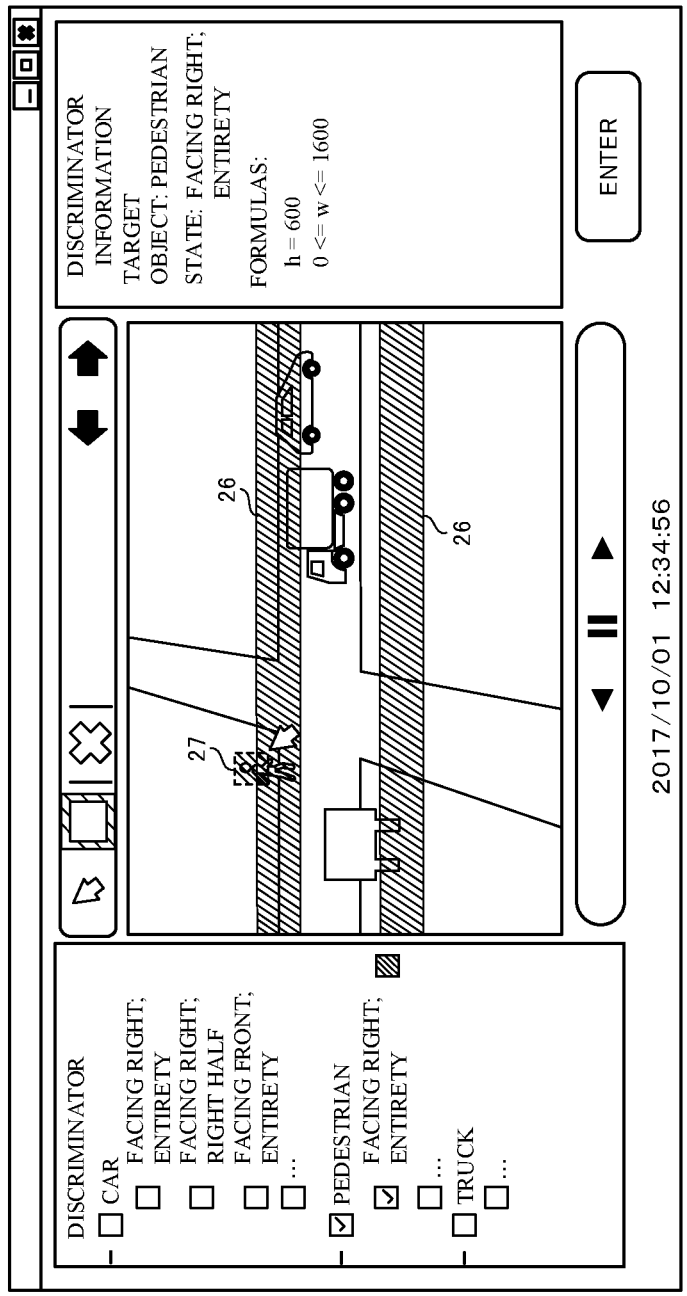
FIG. 10 is a diagram illustrating one example of a screen in a case in which the administrator has added a new discriminator application region in the example embodiment of the invention.
Figure 11:
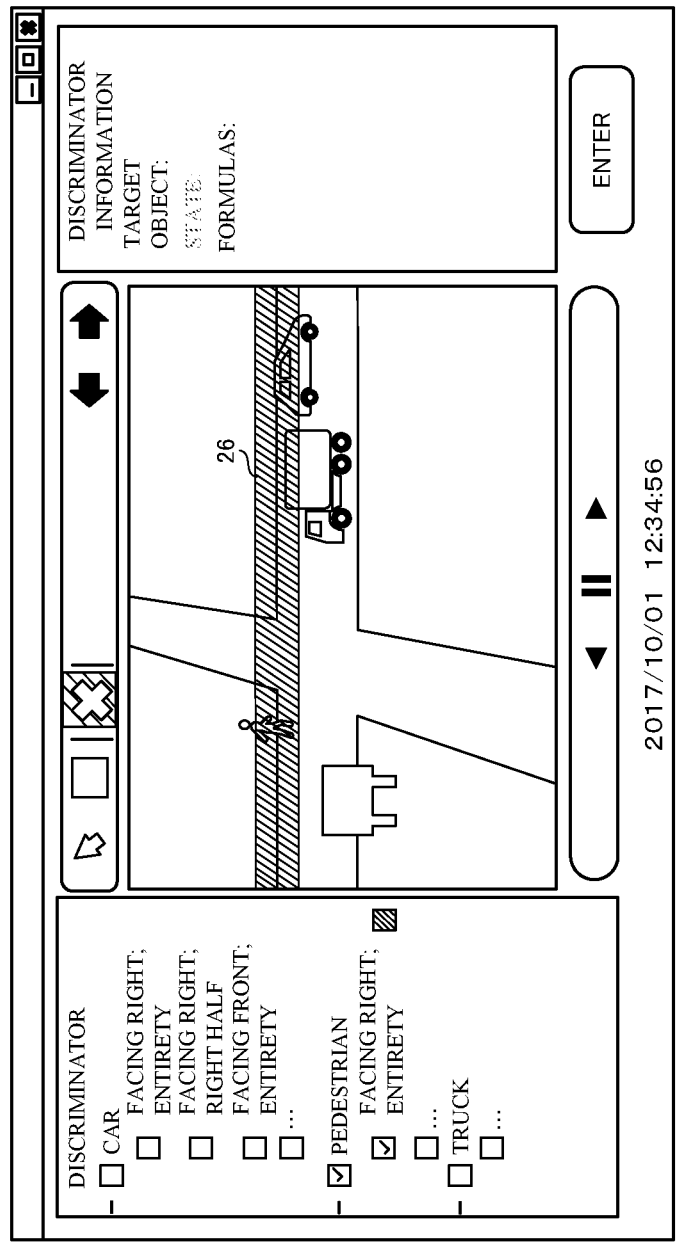
FIG. 11 is a diagram illustrating one example of a screen in a case in which the administrator has deleted a discriminator application region in the example embodiment of the invention.

Here, cases in which an instruction for correction, addition, or deletion is provided in step A4 will be described with reference to FIGS. 9 to 11. FIG. 9 is a diagram illustrating one example of a screen in a case in which the administrator has corrected a discriminator application region in the example embodiment of the invention. FIG. 10 is a diagram illustrating one example of a screen in a case in which the administrator has added a new discriminator application region in the example embodiment of the invention. FIG. 11 is a diagram illustrating one example of a screen in a case in which the administrator has deleted a discriminator application region in the example embodiment of the invention.

In the example illustrated in FIG. 9, the region correction unit 14 has accepted a correction of position performed via input equipment. In this case, the region display unit 13 moves the discriminator application region 26 on the video in accordance with the correction, and changes the position. Furthermore, the region setting unit 12 sets the discriminator application region 26, whose position has been corrected, as a discriminator application region of the new monitoring camera 31. Note that, in the example illustrated in FIG. 9, the position of the upper discriminator application region 26 is changed.

In the example illustrated in FIG. 10, the region correction unit 14 has accepted an addition of a new discriminator application region 27 performed via input equipment. In this case, the region display unit 13 displays, on the video, the new discriminator application region 27, an instruction for the addition of which has been provided. Furthermore, in this case, the region setting unit 12 also sets the new discriminator application region 27, an instruction for the addition of which has been provided, as a discriminator application region of the new monitoring camera 31.

In the example illustrated in FIG. 11, the region correction unit 14 has accepted a deletion of a discriminator application region performed via input equipment. In this case, the region display unit 13 deletes, on the video, the discriminator application region an instruction for the deletion of which has been provided. Furthermore, in this case, the region setting unit 12 excludes, from the discriminator application regions of the new monitoring camera 31, the discriminator application region an instruction for the deletion of which has been provided. In the example illustrated in FIG. 11, the lower discriminator application region is deleted.

Effects of Embodiment

As described above, according to the present example embodiment, discriminator application regions that were set to the existing monitoring camera 30 can be applied to the newly-installed monitoring camera 31, and thus, the incurrence of time and human cost can be suppressed. Also, in the present example embodiment, the correction of a discriminator application region, the setting of a new discriminator application region, and also the deletion of an unnecessary discriminator application region can be performed in accordance with the monitoring point at which a new monitoring camera is installed. In addition, the present example embodiment can also be applied to a case in which an existing monitoring camera is replaced with a new monitoring camera, and in this case, discriminator application regions can be used as-is without making any corrections or the like.

[Modifications]

In the above-described example, the discriminator application region information 25 uses absolute coordinates on a frame to specify positions of discriminator application regions. However, the present example embodiment is not limited to this example. For example, the discriminator application region information 25 may specify a discriminator application region of a discriminator that discriminates a specific object by means of relative coordinates relative to a position of another object or a position of a discriminator application region that co-occurs with the other object. Also, in this case, it is preferable that a user interface (UI) allowing the display and correction, in a relative manner, of a discriminator application region for each discriminator be added to the region display unit 13 and the region correction unit 14.

[Program]

It suffices for the program in the present example embodiment to be a program that causes a computer to execute steps A1 to A7 illustrated in FIG. 5. By installing this program on a computer and executing the program, the video monitoring support apparatus 10 and the video monitoring support method in the present example embodiment can be realized. In this case, the processor of the computer functions as the region acquisition unit 11, the region setting unit 12, the region display unit 13, and the region correction unit 14, and performs the processing. Also, the computer in this case may be a computer forming the video monitoring device 20, or may be a different computer. In the former case, the video monitoring support apparatus 10 would be incorporated in the video monitoring device 20.

Also, the program in the present example embodiment may be executed by a computer system formed from a plurality of computers. In this case, the computers may each function as one of the region acquisition unit 11, the region setting unit 12, the region display unit 13, and the region correction unit 14, for example.

Figure 12:
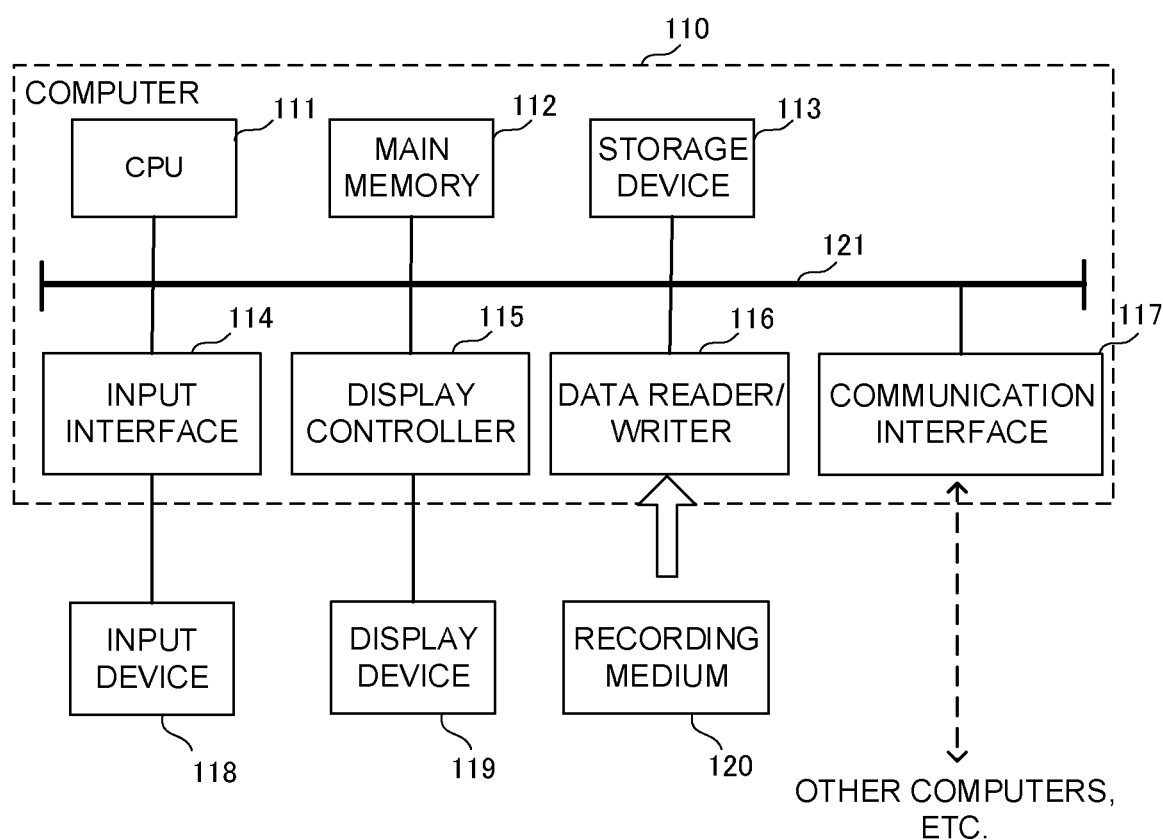
FIG. 12 is a block diagram illustrating one example of a computer realizing the video monitoring support apparatus in the example embodiment of the invention.

Here, a computer that realizes the video monitoring support apparatus 10 by executing the program in the present example embodiment will be described with reference to FIG. 12. FIG. 12 is a block diagram illustrating one example of a computer realizing the video monitoring support apparatus in the example embodiment of the invention.

As illustrated in FIG. 12, a computer 110 includes a central processing unit (CPU) 111, a main memory 112, a storage device 113, an input interface 114, a display controller 115, a data reader/writer 116, and a communication interface 117. These components are connected via a bus 121 so as to be capable of performing data communication with one another. Note that the computer 110 may include a graphics processing unit (GPU) or a field-programmable gate array (FPGA) in addition to the CPU 111 or in place of the CPU 111.

The CPU 111 loads the program (codes) in the present example embodiment, which is stored in the storage device 113, onto the main memory 112, and performs various computations by executing these codes in a predetermined order. The main memory 112 is typically a volatile storage device such as a dynamic random-access memory (DRAM) or the like. Also, the program in the present example embodiment is provided in a state such that the program is stored in a computer readable recording medium 120. Note that the program in the present example embodiment may be a program that is distributed on the Internet, to which the computer 110 is connected via the communication interface 117.

Also, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading of the program from the recording medium 120 and the writing of results of processing in the computer 110 to the recording medium 120. The communication interface 117 mediates data transmission between the CPU 111 and other computers.

Also, specific examples of the recording medium 120 include a general-purpose semiconductor storage device such as a CompactFlash (registered trademark, CF) card or a Secure Digital (SD) card, a magnetic storage medium such as a flexible disk, and an optical storage medium such as a compact disk read-only memory (CD-ROM).

Note that the video monitoring support apparatus 10 in the present example embodiment can also be realized by using pieces of hardware corresponding to the respective units, rather than using a computer on which the program is installed. Furthermore, a part of the video monitoring support apparatus 10 may be realized by using a program and the remaining part of the video monitoring support apparatus 10 may be realized by using hardware.

While a part of or the entirety of the above-described example embodiment can be expressed by (Supplementary Note 1) to (Supplementary Note 12) described in the following, the invention is not limited to the following description.

(Supplementary Note 1)

A video monitoring support apparatus for providing support to make settings in a new monitoring camera in a video monitoring system in which a discriminator is used to detect an object, the video monitoring support apparatus including:

a region acquisition unit configured to acquire, from the video monitoring system, information regarding a discriminator application region that is set to an existing monitoring camera in order to detect an object with a discriminator; and a region setting unit configured to set, to the video monitoring system, a discriminator application region of the new monitoring camera, using the acquired information.

(Supplementary Note 2)

The video monitoring support apparatus according to Supplementary Note 1, further including:

a region display unit configured to display the discriminator application region on a video from the new monitoring camera, using the acquired information; and a region correction unit configured to accept a correction to the displayed discriminator application region, wherein if the correction is accepted by the region correction unit, the region display unit reflects the accepted correction on the video, and if the correction is accepted by the region correction unit, the region setting unit sets the corrected discriminator application region as a discriminator application region of the new monitoring camera.

(Supplementary Note 3)

The video monitoring support apparatus according to Supplementary Note 2, wherein the region correction unit further accepts an addition of a new discriminator application region on the video, if the addition of the new discriminator application region is accepted by the region correction unit, the region display unit displays, on the video, the new discriminator application region that has been accepted, and if the addition of the new discriminator application region is accepted by the region correction unit, the region setting unit also sets the new discriminator application region as a discriminator application region of the new monitoring camera.

(Supplementary Note 4)

The video monitoring support apparatus according to Supplementary Note 2 or 3, wherein the region correction unit further accepts a deletion of the displayed discriminator application region, if the deletion of the discriminator application region is accepted by the region correction unit, the region display unit deletes, on the video, the discriminator application region the deletion of which has been accepted, and if the deletion of the discriminator application region is accepted by the region correction unit, the region setting unit excludes the discriminator application region the deletion of which has been accepted from discriminator application regions of the new monitoring camera.

(Supplementary Note 5)

A video monitoring support method for providing support to make settings in a new monitoring camera in a video monitoring system in which a discriminator is used to detect an object, the video monitoring support method including:

(a) a step of acquiring, from the video monitoring system, information regarding a discriminator application region that is set to an existing monitoring camera in order to detect an object with a discriminator; and (b) a step of setting, to the video monitoring system, a discriminator application region of the new monitoring camera, using the acquired information.

(Supplementary Note 6)

The video monitoring support method according to Supplementary Note 5, further including:

(c) a step of displaying the discriminator application region on a video from the new monitoring camera, using the acquired information;

(d) a step of accepting a correction to the displayed discriminator application region; and (e) a step of, if the correction is accepted by the step (d), reflecting the accepted correction on the video, wherein if the correction is accepted by the step (d), the corrected discriminator application region is set as a discriminator application region of the new monitoring camera in the step (b).

(Supplementary Note 7)

The video monitoring support method according to Supplementary Note 6, further including:

(f) a step of further accepting an addition of a new discriminator application region on the video; and (g) a step of, if the addition of the new discriminator application region is accepted by the step (f), displaying, on the video, the new discriminator application region that has been accepted, wherein if the addition of the new discriminator application region is accepted by the step (f), the new discriminator application region is also set as a discriminator application region of the new monitoring camera in the step (b).

(Supplementary Note 8)

The video monitoring support method according to Supplementary Note 6 or 7, further including:

(h) a step of further accepting a deletion of the displayed discriminator application region; and (i) a step of, if the deletion of the discriminator application region is accepted by the step (h), deleting, on the video, the discriminator application region the deletion of which has been accepted, wherein if the deletion of the discriminator application region is accepted by the step (h), the discriminator application region the deletion of which has been accepted is excluded from discriminator application regions of the new monitoring camera in the step (b).

(Supplementary Note 9)

A computer readable recording medium that includes, recorded thereon, a program for providing support, by means of a computer, to make settings in a new monitoring camera in a video monitoring system in which a discriminator is used to detect an object, the program including instructions that cause the computer to carry out:

(a) a step of acquiring, from the video monitoring system, information regarding a discriminator application region that is set to an existing monitoring camera in order to detect an object with a discriminator; and (b) a step of setting, to the video monitoring system, a discriminator application region of the new monitoring camera, using the acquired information.

(Supplementary Note 10)

The computer readable recording medium according to Supplementary Note 9, wherein the program further includes instructions that cause the computer to carry out:

(c) a step of displaying the discriminator application region on a video from the new monitoring camera, using the acquired information;

(d) a step of accepting a correction to the displayed discriminator application region; and (e) a step of, if the correction is accepted by the step (d), reflecting the accepted correction on the video, wherein if the correction is accepted by the step (d), the corrected discriminator application region is set as a discriminator application region of the new monitoring camera in the step (b).

(Supplementary Note 11)

The computer readable recording medium according to Supplementary Note 10, wherein the program further includes instructions that cause the computer to carry out:

(f) a step of further accepting an addition of a new discriminator application region on the video; and (g) a step of, if the addition of the new discriminator application region is accepted by the step (f), displaying, on the video, the new discriminator application region that has been accepted, wherein if the addition of the new discriminator application region is accepted by the step (f), the new discriminator application region is also set as a discriminator application region of the new monitoring camera in the step (b).

(Supplementary Note 12)

The computer readable recording medium according to Supplementary Note 10 or 11, wherein the program further includes instructions that cause the computer to carry out:

(h) a step of further accepting a deletion of the displayed discriminator application region; and (i) a step of, if the deletion of the discriminator application region is accepted by the step (h), deleting, on the video, the discriminator application region the deletion of which has been accepted, wherein if the deletion of the discriminator application region is accepted by the step (h), the discriminator application region the deletion of which has been accepted is excluded from discriminator application regions of the new monitoring camera in the step (b).

The invention has been described with reference to an example embodiment above, but the invention is not limited to the above-described example embodiment. Within the scope of the invention, various changes that could be understood by a person skilled in the art could be applied to the configurations and details of the invention.

This application is based upon and claims the benefit of priority from Japanese application No. 2018-62890, filed on Mar. 28, 2018, the disclosure of which is incorporated herein in its entirety by reference.

INDUSTRIAL APPLICABILITY

As described above, according to the invention, the incurrence of time and human cost in a case in which a new monitoring camera is installed can be suppressed. The invention is useful in a video monitoring system in which a plurality of discriminators are used to detect objects.

REFERENCE SIGNS LIST

10 Video monitoring support apparatus
11 Region acquisition unit
12 Region setting unit
13 Region display unit
14 Region correction unit
20 Video monitoring device
21 Video acquisition unit
22 Object detection unit
23 Video output unit
24 Discriminator
25 Discriminator application region information
26, 27 Discriminator application regions
30 Existing monitoring camera
31 New monitoring camera
40 Display device
100 Video monitoring system
110 Computer
111 CPU
112 Main memory
113 Storage device
114 Input interface
115 Display controller
116 Date reader/writer
117 Communication interface
118 Input equipment
119 Display device
120 Recording medium
121 Bus

What is claimed is:

1. A video monitoring support apparatus for providing support of setting a new monitoring camera in a video monitoring system, the video monitoring support apparatus comprising:

a memory storing a program; and
a processor configured to run the program to cause the video monitoring support apparatus to perform:
acquiring, from the video monitoring system, information regarding a discriminator application region of an existing monitoring camera;
setting a discriminator application region of the new monitoring camera based on the acquired information;
accepting a deletion of the displayed discriminator application region;
deleting, on the video, the discriminator application region the deletion of which has been accepted in response to a condition the deletion of the discriminator application region is accepted; and
excluding the discriminator application region the deletion of which has been accepted from discriminator application regions of the new monitoring camera in response to a condition the deletion of the discriminator application region is accepted.

2. The video monitoring support apparatus according to claim 1, the processor configured to run the program to cause the video monitoring support apparatus to further perform:
displaying the discriminator application region on a video from the new monitoring camera, based on the acquired information; and
accepting a correction to the displayed discriminator application region,
wherein the processor is further configured to:
reflect the accepted correction on the video in response to a condition that the correction is accepted; and
set the corrected discriminator application region as a discriminator application region of the new monitoring camera in response to a condition that the correction is accepted.

3. The video monitoring support apparatus according to claim 2, wherein the processor is configured to:
accept an addition of a new discriminator application region on the video;
display, on the video, the new discriminator application region that has been accepted in response to a condition that the addition of the new discriminator application region is accepted; and
set the new discriminator application region as a discriminator application region of the new monitoring camera in response to a condition that the addition of the new discriminator application region is accepted.

4. A video monitoring support method performed by a video monitoring support apparatus for providing support to make settings in a new monitoring camera in a video monitoring system, the video monitoring support method comprising:
acquiring, from the video monitoring system, information regarding a discriminator application region that is set to an existing monitoring camera in order to detect an object with a discriminator;
setting a discriminator application region of the new monitoring camera based on the acquired information;
accepting a deletion of the displayed discriminator application region;
deleting, on the video, the discriminator application region the deletion of which has been accepted in response to a condition that the deletion of the discriminator application region is accepted, and
excluding, when the discriminator application region is set, the discriminator application region the deletion of which has been accepted from discriminator application regions of the new monitoring camera, in response to a condition that the deletion of the discriminator application region is accepted.

5. The video monitoring support method according to claim 4, further comprising:
displaying the discriminator application region on a video from the new monitoring camera, based on the acquired information;
accepting a correction to the displayed discriminator application region; and
reflecting the accepted correction on the video in response to a condition that the correction is accepted, wherein
when the discriminator application region is set, the corrected discriminator application region is set as a discriminator application region of the new monitoring camera, in response to a condition that the correction is accepted.

6. The video monitoring support method according to claim 5, further comprising:
further accepting an addition of a new discriminator application region on the video; and
displaying, on the video, the new discriminator application region that has been accepted in response to a condition that the addition of the new discriminator application region is accepted, wherein
when the discriminator application region is set, the new discriminator application region is also set as a discriminator application region of the new monitoring camera, in response to a condition that the addition of the new discriminator application region is accepted.

7. A non-transitory computer readable recording medium that includes, recorded thereon, a program for providing support, by means of a computer, to make settings in a new monitoring camera in a video monitoring system,
the program including instructions that cause the computer to carry out:
from the video monitoring system, information regarding a discriminator application region that is set to an existing monitoring camera in order to detect an object with a discriminator;
setting a discriminator application region of the new monitoring camera based on the acquired information;
accepting a deletion of the displayed discriminator application region;
deleting, on the video, the discriminator application region the deletion of which has been accepted in response to a condition that the deletion of the discriminator application region is accepted, and
excluding, when the discriminator application region is set, the discriminator application region the deletion of which has been accepted from discriminator application regions of the new monitoring camera, in response to a condition that the deletion of the discriminator application region is accepted.

8. The non-transitory computer readable recording medium according to claim 7, wherein the program further includes instructions that cause the computer to carry out:
displaying the discriminator application region on a video from the new monitoring camera, based on the acquired information;
accepting a correction to the displayed discriminator application region; and
reflecting the accepted correction on the video in response to a condition that the correction is accepted, wherein
when the discriminator application region is set, the corrected discriminator application region is set as a discriminator application region of the new monitoring camera, in response to a condition that the correction is accepted.

9. The non-transitory computer readable recording medium according to claim 8, wherein the program further includes instructions that cause the computer to carry out:
further accepting an addition of a new discriminator application region on the video; and
displaying, on the video, the new discriminator application region that has been accepted in response to a condition that the addition of the new discriminator application region is accepted, wherein
when the discriminator application region is set, the new discriminator application region is also set as a discriminator application region of the new monitoring camera, in response to a condition that the addition of the new discriminator application region is accepted.

\* \* \* \* \*